United States Patent [19]
Rau et al.

[11] Patent Number: 4,752,513
[45] Date of Patent: Jun. 21, 1988

[54] REINFORCEMENTS FOR PULTRUDING RESIN REINFORCED PRODUCTS AND NOVEL PULTRUDED PRODUCTS

[75] Inventors: Robert B. Rau, Aurora, Ohio; Walter J. Reese, North Huntington, Pa.

[73] Assignee: PPG Industries, Inc., Pittsburgh, Pa.

[21] Appl. No.: 74,665

[22] Filed: Jul. 17, 1987

Related U.S. Application Data

[63] Continuation-in-part of Ser. No. 34,159, Apr. 9, 1987, abandoned.

[51] Int. Cl.$^4$ .............................................. B32B 5/06
[52] U.S. Cl. ...................................... 428/91; 428/95; 428/234; 428/235; 428/294; 428/300
[58] Field of Search ................. 428/91, 95, 234, 235, 428/294, 300

[56] References Cited

U.S. PATENT DOCUMENTS

| 4,207,129 | 6/1980 | Tadewald | 156/242 |
| 4,335,176 | 6/1982 | Baumann | 428/235 |
| 4,404,717 | 9/1983 | Neubauer et al. | 28/107 |
| 4,504,538 | 3/1985 | Mussallem | 428/235 |

FOREIGN PATENT DOCUMENTS 0113209 11/1984 European Pat. Off. .

Primary Examiner—Marion C. McCamish
Attorney, Agent, or Firm—John E. Curley

[57] ABSTRACT

Novel resin reinforcing composite mats of continuous strands are described for use in pultrusion processes. The pultruded parts are characterized by having a reinforcement of mats and rovings with the reinforcing mats and rovings being distributed throughout the parts.

34 Claims, 3 Drawing Sheets

REINFORCEMENTS FOR PULTRUDING RESIN REINFORCED PRODUCTS AND NOVEL PULTRUDED PRODUCTS

This application is a continuation in part of our co-pending application, U.S. Ser. No. 34,159, filed Apr. 9, 1987, now abandoned.

The present invention relates to novel fiber reinforcements used in preparing resin reinforced articles in a pultrusion process. More particularly, the present invention relates to pultruded resin articles which are reinforced with mats and fibers in unique orientations to enhance surface characteristics and tensile strengths. Still more particularly, the present invention relates to novel combinations of mechanically-bonded continuous strand mats; and in particular, to needled continuous strand mats in which at least one mat has non-chemically bonded continuous strands, and that mat is needled to a second continuous strand mat in which the continuous strands are bound to each other either chemically or mechanically and these mats are used with other reinforcing strands to produce resin articles of enhanced appearance and/or strength.

BACKGROUND OF THE INVENTION

It has been a practice in the pultrusion of articles such as window spacers, for example, to prepare the article by passing reinforced strands or rovings through a resin bath with an appropriate fibrous, continuous strand mat surrounding the rovings. The mat and rovings as they pass through bath are impregnated with a resin, typically an unsaturated polyester. The resin rich mat and strands are then fed to a pultrusion die and are pulled through the die. The die is normally heated to provide a temperature sufficient to cause the resin to cure so that a solid article is removed from the exit end of the die. The process is convenient in preparing articles such as window and/or door framing members. A more complete description of the typical pultrusion process used to prepare each article is contained in European patent application No. 0 113 209.

While the aforementioned patent describes a process and articles of manufacture that are useful, there are some drawbacks to both. In preparing parts which have ribbing or sharp turns, it has been found that the mat used frequently does not fill the turns or ribs to the full depth of either. This leaves a portion of the part without the desired mat reinforcement. Further, the parts frequently do not possess surfaces that are acceptable in the aesthetic sense. It has also been found that the chemically bonded mats heretofore employed in the pultrusion processes hereinbefore discussed, frequently are inadequate in strength in narrow widths to withstand the pulling forces to which they are subjected without tearing during pultrusion.

Thus a need exists in the art for reinforcements for use in pultrusion processes that have satisfactory handling characteristics so that all portions of a pultruded part are reinforced on a substantially uniform basis. Pultruded articles having substantially uniform reinforcement throughout, and tensile properties in all direction that are adequate for the intended use are also needed. Finally, a need exists for pultruded products which have good surface appearance on all surfaces of the part. The present invention supplies these needs.

SUMMARY OF THE INVENTION

In accordance with one embodiment of the instant invention, reinforcement mats are provided for use in pultrusion molding of parts that are combinations of at least two mats held together by a mechanical bonding process; i.e., needling with barbed needles to provide a composite mat that will withstand the pulling forces encountered during pultrusion without damage. In another embodiment of the invention, a pultruded article is formed which is reinforced with a plurality of strands sandwiched between reinforcing mats each of which is formed from at least two continuous strand mats. In a further embodiment of the invention a continuous strand mat is needled to a bonded scrim cloth to provide a scrim-mat composite reinforcement for use in a pultrusion process. In a still further embodiment of the invention, two composite mats each containing two continuous strand mats are needled together to provide a spiked side and a non-spiked side in the composite mats. The mats are fed into a die in which reinforcing strands are being fed between the two mats in the die. The mats are further placed in the die so that the spiked sides of both mats face inward toward the surface of the strands being fed between the mats. This embodiment of the invention is a preferred mode of operation where enhanced flexural and tensile strength are desired in the pultruded articles.

In another embodiment of the invention, high density needled continuous strand mat, preferably of glass fiber strands with the mat having a density of at least 0.75 ounces per square foot or more is used in lieu of either a composite needled mat or a chemically bonded mat for producing a pultruded article.

In a still further embodiment, the spiked sides of the high density mats used are positioned so that they face toward each other in the article being pultruded to produce parts having enhanced surface characteristics. This is a preferred embodiment where small sharp protrusions, ridges and the like in the pultruded part require a more complete filling thereof with reinforcement for enhanced strength.

BRIEF DESCRIPTION OF THE DRAWINGS

The foregoing embodiments, features, and advantages of the present invention will become apparent to those skilled in the art from a consideration of the following descriptions of the preferred embodiments of the invention taken in conjunction with the accompanying drawings in which.

DETAILED DESCRIPTION OF THE INVENTION

Figures 1, 2:
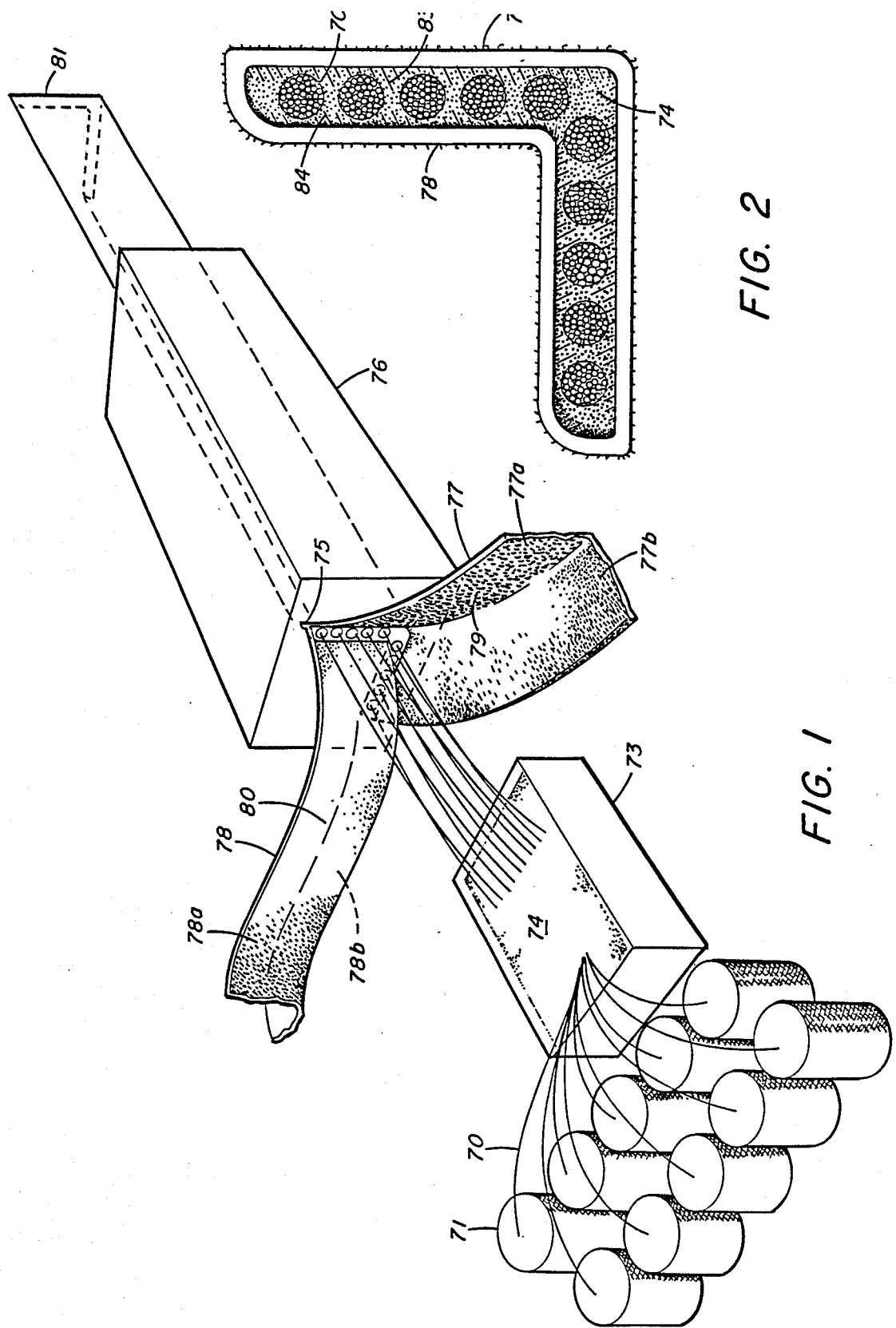
FIG. 1 is a diagrammatic illustration of a pultrusion process utilizing continuous strand reinforcement mat which produces pultruded fiber reinforced resin articles of the instant invention.
FIG. 2 is a cross section of an article prepared in accordance with the instant invention to illustrate the orientation of the reinforcement within the article.

In accordance with the instant invention and the preferred embodiments, a composite mat is utilized in reinforcing the resin articles that are to be pultruded to form the novel articles of manufacture. Composite mats produced in accordance with the instant invention are composed of a light weight continuous surface mat and a continuous strand reinforcing mat. Both mats are characterized by having the fibers randomly distributed throughout the mat. In the composite mats described in the instant specification the continuous strand reinforcement mats which are coupled to the continuous strand or filament surface mats are preferably constructed of glass fibers. While composite mats are preferred, it is within the scope of the invention to use a needled continuous strand mat alone provided it has a high density. By high density is meant a continuous strand reinforcement mat having a density of at least 0.75 ounces per square foot or more, preferably 1.5 ounces per square foot. Generally high density continuous strand mats ranging in density between 0.75 to two ounces or more are useful. In instances where reinforcement mats of this type are used, continuous glass strand mats are preferred.

In producing mats of glass fibers, the fiber size can range widely between a fiber strand which is composed of filaments ranging from a DE filament to a T filament or higher. Generally speaking, the filament size ranges from $20 \times 10^{-5}$ to $95 \times 10^{-5}$ inches. In the Preferred embodiment of the instant invention, the filaments are generally in the range of 35 to $40 \times 10^{-5}$ inches. In the surfacing mats utilized when the surfacing mat is composed of fiber glass, the fibers generally range in size with those above mentioned.

Surfacing mats of natural or synthetic fibers having similar fiber diameters or even larger diameters and may be employed in lieu of glass fiber mats.

"Scrim" as used herein means an open weave cloth of synthetic or natural fiber strands having at least four holes per square inch of cloth formed by the weave.

Where the term "chemically bound" is utilized in the application and in the claims with respect to fiber strands in mats, the term is meant to include a bonding of the fiber strands one to the other by utilization of a chemical bonding agent such as a thermoplastic or a thermoset resin. In instances where the surface mats are utilized it is often common practice to join the fiber strands forming the mat to each other by mixing strands of different melting points together and melting one of the strands to accomplish the bonding. Similarly, when glass fiber scrim cloths or synthetic or natural fiber cloths are employed to manufacture scrim or mats for surface mat utilization, bonding is accomplished by utilizing thermoplastic resins or thermoset resins which effectively bond the strands one to the other in the mat being constructed to provide integrity to the mat.

Where the term "mechanically bound" is utilized in the specification and claims, this intended to mean bonding mats one to the other by entangling the strands of one mat intimately with the strands of the other mat utilizing a barbed unthreaded needle to thereby penetrate both mats with the needle to thereby push strands of one of the mats through the other mat and thoroughly entangle strands of both mats together. The term is also used to describe the entangling of strands with each other when a continuous strand mat is needled by itself using the above described barbed needles. The process for accomplishing this is described in detail in U.S. Pat. No. 4,404,717, which is incorporated herein by reference.

In all instances where fiber strands and reinforcement mats are discussed in the instant specification and claims with respect to the production of a pultruded article it will be understood by the skilled artisan that these mats and strands are composed of fibers which have a compatibility with the resin that is being utilized to form the article. It is well known to the skilled artisan, for example, that glass fibers utilized in the manufacture of various glass fiber reinforced resin materials have applied to their surfaces sizes and binders which are compatible with the resin system to which the fiber is to be applied as a reinforcement material. Thus, manufacturers provide fibers for reinforcing various type resin systems such as polycarbonates, epoxy resins, unsaturated polyesters, thermoplastic resins and the like. The particular size employed in the mats and fiber strands utilized to reinforce the resin article herein will be determined, therefore, by the resin system utilized in forming the article. Once the resin has been determined with respect to the article that is to be produced, glass manufacturers and synthetic fiber manufacturers can readily supply a resin compatible strand for utilization as reinforcement with that particular resin system.

The resin systems utilized in producing the articles of the instant invention may be neat or they may be filled. In the preferred embodiments of the instant invention the resins contain fillers in varying amounts. Generally speaking, the fillers are present in amounts ranging from a trace amount to 30 percent, preferably 10 to 25 percent and most preferably 15 percent. The fillers may be any suitable filler utilized by the art to fill a resin system of the type being produced. Generally speaking, fillers such as calcium carbonate, titanium dioxide, silicon dioxide, carbon black and the like may be used.

In preparing the mats of the instant invention, needles of various types may be utilized to accomplish the combining of the surface mat with the major fiber glass strand mat or to needle together the strands used to form the high density strand mats. Needles ranging from 15 gauge needles to 32 gauge are certainly acceptable depending on the qualities desired in the final mat product. Generally speaking, it is preferred to utilize 25 gauge needles having barbs pointing in the downward direction with respect to the mat passed through the needling machine when glass strands are used so that the glass strands are carried through the surfacing mat which is typically located below the fiber glass mat during manufacture as will be fully understood from the ensuing description of FIG. 5. This same 25 guage needle is used in the preparation of high density glass mats from glass fiber strands.

The term "strand" means, as used herein, a multiplicity of filaments combined together and can include rovings as that term is generally understood by the skilled artisan, i.e., a plurality of strands combined mechanically on a roving winder. Direct draw rovings of the type shown in U.S. Pat. No. 4,509,702 are also encompassed by this term.

The term "spiked surface" utilized herein the specification shall mean a dense major surface of the needled composite mat or the high density needled mat which contains a multiplicity of the elongated filaments and/or fibers or strands projecting from the surface outwardly. The filaments, fibers and/or strands projecting from the surface of the mat on the spiked surface thereof are referred to herein as spikes.

The term "non-spiked" surface means a less densely spiked major surface of the same mat that contains a spiked surface.

The resin materials that may be utilized in preparing the articles of the instant invention are generally speaking thermoset resins and the preferred embodiments of the invention incorporate utilization of unsaturated polyester thermoset resins.

It is also within the contemplation of the invention that thermoplastic resins both as homopolymers and copolymers may be utilized in preparing articles in utilizing pultrusion techniques. With respect to polyester resins, as far as the thermoset resins are concerned, they can be aldehyde condensate resins and unsaturated polyester such as vinylesters, epoxies, phenolic resins, alkyd resins, silicone resins and diallyl phthalate homopolymers and polyamide, urea and melamine containing resins and polyurethanes to mention just a few.

In utilizing thermoplastic resins, materials may be utilized which are vinyl resins formed by the polymerization of vinyl halides or by the copolymerization of vinyl halides with unsaturated polymerized compounds such as vinyl esters; alpha, beta-unsaturated acids; alpha, beta-unsaturated esters; alpha, beta-unsaturated ketones; alpha, beta-unsaturated aldehydes and unsaturated hydrocarbons such as butadienes and styrenes; poly-alpha-olefins such as polyethylene, polypropylene, polybutylene, polyisoprene and the like including copolymers of poly-alpha-olefins; phenoxy resins; polyamides such as polyhexamethylene adipamide; polysulfones; polycarbonates; polyacetyls; polyethylene oxide; polystyrene, including copolymers of styrene with monomeric compounds such as acrylonitrile and butadiene; acrylic resins as exemplified by the polymers of methyl acrylate, acrylamide, methylacrylamide, acrylonitrile and copolymers of these with styrene, vinyl pyridines, etc; neoprene; polyphenylene oxide resins; polymers such as polybutylene terephthalate and polyethyleneterephthalate; and cellulose esters including the nitrate, acetate, propionate, etc.

The fibers, strands and or filaments referred to herein, except for those specifically excluded by the claim terminology, are intended to include synthetic fibers such as polyester fibers, thermoplastic fibers such as polypropylenes, polyphenylene sulfide fibers, nylons, ORLON®, DACRON® and other similar materials.

The term "natural fibers" as used herein is meant to include cotton, wool, linen, jute and the like. "Inorganic fibers" is intended to include glass fibers, carbon fibers, ceramic fibers and the like.

Figure 5:
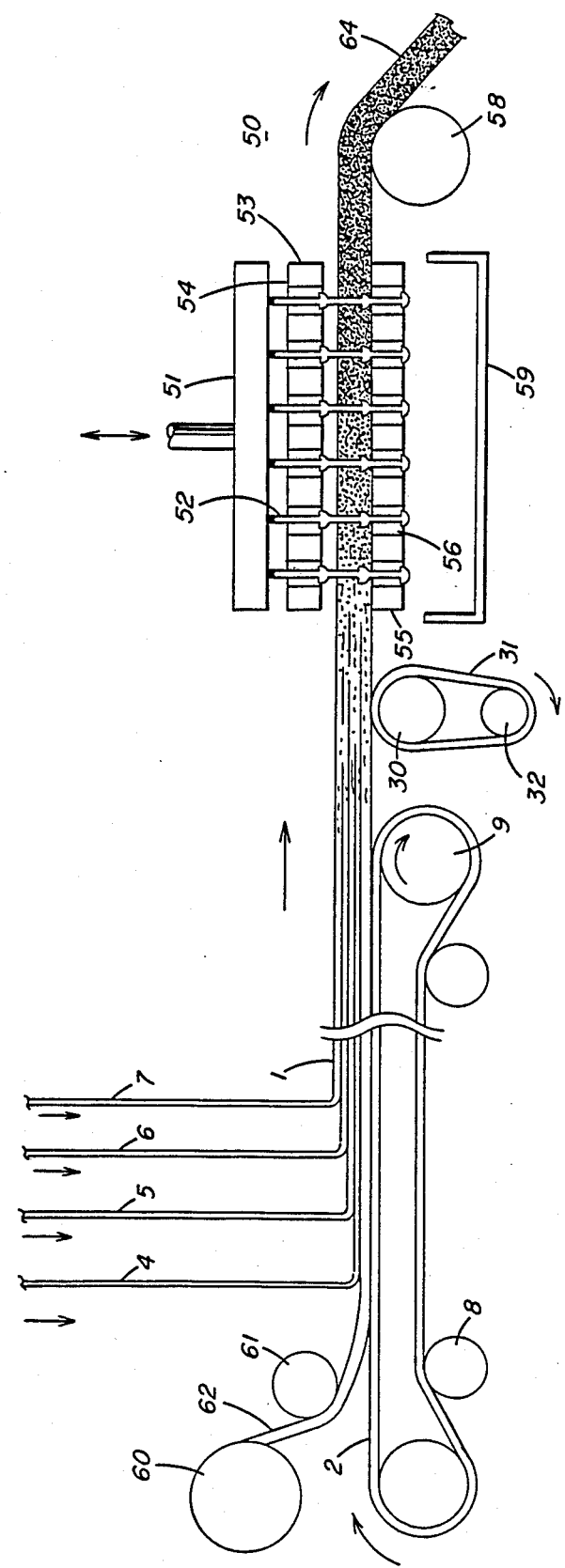
FIG. 5 is a diagrammatic illustration of a process suitable for manufacturing the novel mat reinforcements of the instant invention.

Turning now to the drawings and in particular to FIG. 5 there is shown in the drawing, a plurality of the glass strands 4, 5, 6, and 7 being fed onto the surface of a moving conveyor 2. While the drawing is a side elevation of the system, it will be understood by the skilled artisan that strands 4, 5, 6, and 7 are moved back and forth across the conveyer surface transverse to the path of travel thereof to thereby lay down on the conveyor surface sufficient strands to provide a mat of a given width and density. These strands 4, 5, 6 and 7 are fed through a feeding device similar to that shown in the U.S. Pat. No. 4,340,406 and the traversing system utilized is similar to that shown and described in U.S. Pat. No. 4,340,406 both of which are herein incorporated by reference.

Prior to feeding the strands 4, 5, 6, and 7 to the conveyer 2, a mat 62 is fed from a roll 60 of that material 60 across a feed roller 61 and onto the surface of the conveyor 2. With this arrangement, the mat 62 is of the desired width of the final product or something slightly larger and the strands 4, 5, 6, and 7 as they traverse across the width of the conveyer 2 and the mat 62 contained thereon lay down between the edges of the mat 62 a loose mat of continuous strands. The strands 4, 5, 6, and 7 laid down on the mat 62 pass forwardly to a needler generally indicated at 50.

Underlying mat 62 and the overlying strands 4, 5, 6, and 7 are passed over roll 30 which has a chain 31 wrapped around and passing over idler roll 32 and roll 30 which conveys the mat composite into a needler 50. In needler 50, a needle board 51 containing barbed needles 52 tharein is designed to mesh with apertures 56 coinciding with the positioning of the needles 52. The plate 55 having apertures 56 is stationery and mounted in a suitable housing 59 and needle board 51 in operation reciprocates in a vertical direction. Thus, as the mat composed of the mat 62 and the loose fiber glass strands 4, 5, 6, and 7 passes through the needling machine 50 they are joined together by the downward stroke of the needles 52 which punch the strands 4, 5, 6, and 7 through the lower mat 62 and entangle them thoroughly so that a final composite product 64 is removed off of roll 58 for utilization as part of the reinforcement for the novel products herein after described. As the needles retract, a stripper plate 53 knocks any loose strands from the surfaces of the needles onto the mat surface.

When a strand mat is produced an lieu of the composite mat shown being produced in the drawing of FIG. 5, the strand 4, 5, 6 and 7 are laid down on the conveyor 2 as shown, but the feeding of the mat 62 is eliminated. Except for the exclusion of mat 62, the process proceeds as described above.

Turning to FIG. 1, there is shown a pultrusion process which is designed to combine mats 64 of the type formed in the machinery of FIG. 5, whether they are composite mats or high density mats, with suitable reinforcement strands. Thus, FIG. 1 shows continuous strands 70 being drawn from a plurality of packages generally indicated at 71. Strands 70, which can also be rovings, are drawn through a container 73 which is filled with a polyester resin material 74. Strands 70 are drawn through the resin bath 73 from one end to the other under rods not shown in the drawing but located along the bottom of the resin bath 73 so that the strands 70 are totally immersed in the resin. Soaked strands 70 are then passed into the aperture 75 of an elongated die 76 which is typically heated along its length.

On both sides of the strands 70 being fed to the opening 75 of the die 76 are fed two continuous strand mats 77 and 78. Mat 77 has a fold 79 in the center thereof, mat 76 has a fold 80 in the center thereof. The fold in 79 divides mat 77 into two halves as 77a and 77b and the fold 80 in mat 78 divided that mat into two folds 78a and 78b. The mats 77 and 78 being fed to the die may be previously immersed in the same polyester resin that the fibers 70 have been immersed in the same container 73 or in another container but need not be so immersed. When not immersed in resin, the mats 77 and 78 obtain sufficient resin for impregnation thereof through contact with the resin rich strands 70. Thus, the mats 77 and 78 and the resin impregnated strands 70 form a sandwich arrangement in the die so that the strands 70 are completely surrounded in the die on all surfaces by a portion of either mat 77 or 78. The combination of mats 77 and 78 and rovings 70 together with the resins impregnated all over them passes through the die from the inlet end to the exit end. The mats, rovings and resin are heated during their passage through the die to temperatures sufficient to cause the resin contained in the die to cure. Thus, a solid product is formed and is removed from the exit end of the die.

If the resin employed in the pultrusion process were a thermoplastic resin as opposed to the thermoset resin of the preferred embodiments, obviously the mats 77 and 78 and the strands 70 would be impregnated with molten thermoplastic immediately prior to being introduced into the die opening 75. Rather than being heated along its length, the die 76 would be cooled along its length so that the thermoplastic resin would solidify during its passage through the die to form a finished part 81, a major component of which would be a thermoplastic resin.

FIG. 2 is a cross section of the part 81 of FIG. 1 showing the strands or rovings 70, the mats 77 and 78 and the orientation of the spiked surface 83 of mat 77 and the spiked surface 84 of mat 78 in one of the preferred embodiments.

Figure 3:
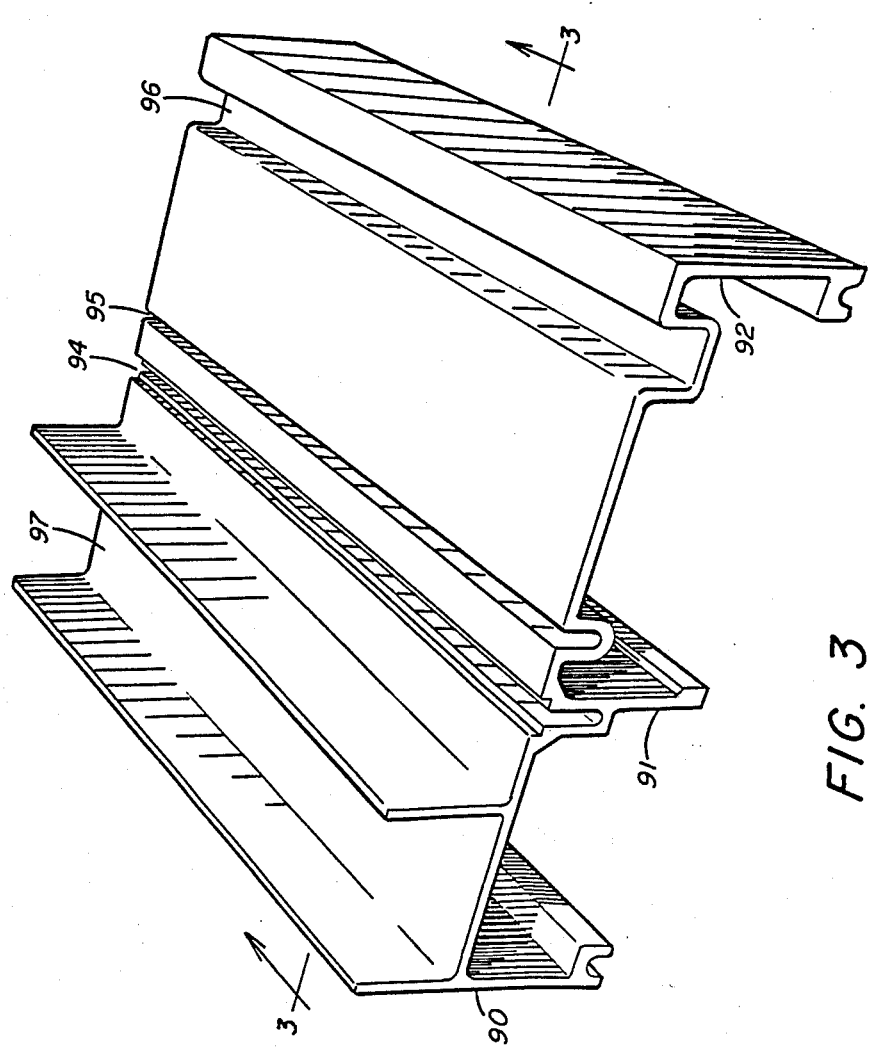
FIG. 3 is a perspective view of a pultruded article of the instant invention.

As can be readily seen in FIG. 3, the finished product, which in this instance as shown in the drawing, is a complex patio sliding door jamb possesses many complex shapes and curvatures thereon. Both of the mats 77 and 78 and the rovings 70 sandwiched between the mats 77 and 78 are positioned such that the spikes on the mat surfaces 83 and 84 are facing inwardly towards the roving 70 in a part having such complex grooves and ridges.

Figure 4:
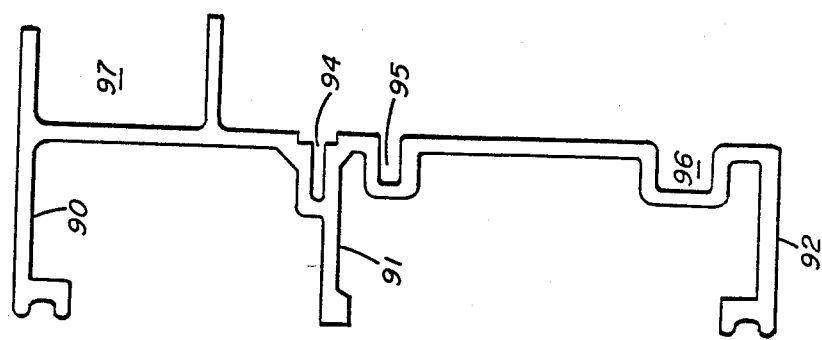
FIG. 4 is a cross section taken along lines 3—3 of FIG. 3.

In mats herebefore used in the prior art, great difficulty has been encountered filling ribs such as ribs 90, 91 and 92 of the part 90 shown in FIG. 4 or the curved slots 94, 95, and 96 as well as the elongated channel member 97. Typically utilizing mats of the prior art, which are generally speaking continuous strand mats of glass fibers which are held together by polyester resin bonding agents, the parts fail to fill in narrow compound bends such as those shown in 94, 95 and 96 or in a channel 97. Using the composite mats or the high density mats of the instant invention, these parts have filled readily with little or no difficulty being encountered. Further, the mats of the instant invention pass through the pultrusion die 76 with ease and are found to be of sufficient integrity that they do not tear during the passage.

For a more complete understanding of the present invention reference is made to the accompanying examples which illustrate the preferred method of preparation of mats and the preferred method of preparation of the pultruded articles constructed from such mats.

EXAMPLE 1

In constructing composite reinforcement mats equipment was used similar to that diagrammatically illustrated FIG. 4. A mat 46 inches wide was prepared as follows using this equipment. Two feeders were employed to feed fiber glass strands to the surface of a conveyor moving in a direction generally at an angle normal to the angle at which the strands were being fed to the surface thereof. Thus, the strands were being fed in a downward direction from a feeder similar to the feeder shown in U.S. Pat. No. 4,340,406. The feeder was operated at a speed to provide strand speeds of 1175 feet per minute. The strands passed downwardly onto the surface of a horizontally moving conveyor chain. Eight strands were fed to each feeder, each set of strands containing 800 filaments. The strands were traversed back and forth across the moving conveyor at a rate of 1 cycle every 6.5 seconds, a single traverse over and back being one cycle. On the moving conveyor and moving with the conveyor at a speed of 10 feet per minute was a Remay ® polyester surfacing mat manufactured by E. I. DuPont having a mat density of 1.35 ounces per square yard. Fiber glass strands which were placed on the surfacing mat contained a size having polyester resin compatible ingredients. The size composition used contained a polyester resin film former, a glycidol propyltrimethoxy silane coupling agent, a fatty acid lubricant and acetic acid. The amount of size on the glass fibers was 0.9 percent by weight basis the weight of the glass.

After passing across the conveyor, the mat was passed into a needling machine which had 25 gauge needles therein reciprocating in a vertical direction as the mat passed through the needler. The needles and needle boards utilized provided 150 needle penetrations per square inch in the finished mat and the needles passed through the bottom orifices in the base plate of the needler to a depth of about 0.8 inches. Thus, the barbed needles, which have the barbs pointed in a downward direction, caught the glass fibers and passed them through the polyester mat to a depth of about 0.8 inches on the downward stroke. This mat was removed from the needling machine and is typically 1 ounce per square foot in density.

EXAMPLE 2

Glass fiber strands having filaments in a diameter range of $90-95 \times 10^{-5}$ inches and wherein each of the strands contains 4,000 filaments are passed through a resin bath of Koppers Co. B753-118 unsaturated polyester resin having 15 percent calcium carbonate therein to thoroughly saturate the strands and filaments contained therein with the polyester resin. The rovings are fed to a pultrusion die and the mats are then passed into the pultrusion die on the outside of the rovings as shown in FIG. 1 herein. The die is an elongated die having a central opening conforming to a configuration such as shown in FIG. 3. The die is approximately 40 inches in length and is clamped along its length between two resistance heated plates which are individually controlled to provide a temperature gradient from the inlet end of the die to the outlet end thereof. The rovings and the mats passing through the die pass through it at a rate of approximately 3 to 4 feet per minute, and the die is heated at the entrance to a temperature of about 200° F. The center of the die operates at a temperature of approximately 390° F. and the exit of the die at approximately 350° F. The parts flowing through the die are roughly 40-45 percent resin with 55-60 percent of the remainder being glass reinforcements. The resin itself is 70 percent Polyester and 30 percent filler and other additives such as coloring agents, catalysts and the like. The parts removed are cut into appropriate lengths for use as door jambs.

EXAMPLE 3

In constructing high density reinforcement mats of glass strands equipment was used similar to that diagrammatically illustrated FIG. 4. A mat 46 inches wide was prepared as follows using this equipment. Two feeders were employed to feed fiber glass strands to the surface of a conveyor moving in a direction generally at an angle normal to the angle at which the strands were being fed to the surface thereof. Thus, the strands were being fed in a downward direction from a feeder similar to the feeder shown in U.S. Pat. No. 4,340,406. The feeder was operated at a speed to provide strand speeds of 1175 feet per minute. The strands passed downwardly onto the surface of a horizontally moving conveyor chain. Eleven strands were fed to each feeder, each set of strands containing 400 filaments. The strands were traversed back and forth across the moving conveyor at a rate of 1 cycle every 6.5 seconds. A single traverse over and back being one cycle. The moving conveyor was traveling at a speed of 4 feet per minute. The strand speed and quantities of strand coupled with the conveyor speed produced a mat having a density of 1.5 ounces per square foot. The fiber glass strands introduced onto the conveyor contained a size having polyester resin compatible ingredients. The strands thus contained a coating or size thereon comprised primarily of a polyvinylacetate film former, a gamma-aminopropyltriethoxy silane, a vinyl triacetoxy silane, a fatty acid lubricant, ammonium chloride, a melamine-formaldehyde curing agent and a quaternary ammonium lubricating agent. The amount of size on the glass fibers was 0.9 percent by weight basis the weight of the glass.

After passing across the conveyor, the mat was passed into a needling machine which had 25 gauge needles therein reciprocating in a vertical direction as the mat passed through the needler. The needles and needle boards utilized provided 315 needle penetrations per square inch in the finished mat and the needles passed through the bottom orifices in the base plate of the needler to a depth of about 0.65 inches. Thus, the barbed needles, which have the barbs pointed in a downward direction, catch the glass fibers from the top surface and the inside of the mat and pass them through the bottom of the mat to a depth of about 0.65 inches on the downward stroke.

EXAMPLE 4

Glass fiber strands having filaments in a diameter range of $90-95 \times 10^{-5}$ inches and wherein each of the strands contains 4,000 filaments are passed through a resin bath of Koppers Co. B753-118 unsaturated polyester resin having 15 percent calcium carbonate therein to thoroughly saturate the strands and filaments contained therein with the polyester resin. The rovings are fed to a pultrusion die and two mats produced as in Example 3 are then passed into the pultrusion die on the outside of the rovings as shown in FIG. 1 herein. The die is an elongated die having a central opening conforming to a configuration such as shown in FIG. 3. The die is approximately 40 inches in length and is clamped along its length between two resistance heated plates which are individually controlled to provide a temperature gradient from the inlet end of the die to the outlet end. The rovings and the mats passing through the die pass through it at a rate of approximately 3 to 4 feet per minute, and the die is heated at the entrance to a temperature of about 200° F. The center of the die operates at a temperature of approximately 390° F. and the exit of the die at approximately 350° F. The parts flowing through the die are roughly 40-45 percent resin with 55-60 percent of the remainder being glass reinforcements. The resin itself is 70 percent polyester and 30 percent filler and other additives such as coloring agents, catalysts and the like. The parts removed are cut into appropriate lengths for use as door jambs.

The above examples are illustrations of preferred methods of providing the articles of the instant invention and the reinforcement mats to be utilized with such articles. Thus, window and door framing materials can be produced readily from a system of this type. In general, the mats and the articles of manufacture herein described find a variety of uses where reinforcement is required in all directions and superior reinforcement is required in a single direction. The parts are particularly useful where it is also important that the surface characteristics of the finished part be such that they present smooth surfaces. The parts further are characterized by being extremely resistance to delamination of the surface reinforcements under stress.

While the invention has been described with reference to certain specific examples and illustrated embodiments, it is not intended to be limited thereby except insofar as it appears in the accompanying claims.

We claim:

1. A pultruded fiber reinforced resin article of manufacture having as the fiber reinforcement a plurality of resin impregnated fiber strands placed in spaced relationship to each other and running parallel to each other and at least one axis of the article, at least two resin impregnated reinforcement mats positioned on opposite sides of said strands, each of said mats having a spiked surface and wherein the mats are positioned such that the spiked surface of each mat faces the fiber strands 2. The pultruded fiber reinforced article of claim 1, wherein the spikes and the fiber strands are in intimate contact with each other.

3. The pultruded fiber reinforced article of claim 1, wherein the fiber strands are glass fiber strands and the reinforcement mats are glass fiber mats.

4. The pultruded fiber reinforced resin article of claim 1, wherein the fiber strands are glass fibers, the mats are composite needled mats of synthetic fibers and glass fibers.

5. The pultruded fiber reinforced resin article of claim 4, wherein the spikes are in intimate contact with said glass fibers.

6. The article of claim 5, wherein the resin is a polyester resin.

7. The article of claim 5, wherein the resin is a thermoset resin.

8. The article of claim 7, wherein the resin contains a filler.

9. The article of claim 5, wherein the resin contains a filler.

10. The article of claim 4, wherein the resin is a polyester resin.

11. The article of claim 4, wherein the resin is a thermoset resin.

12. The article of claim 11, wherein the resin contains a filler.

13. The article of claim 4, wherein the resin contains a filler.

14. The article of claim 1 wherein the resin is a thermoplastic resin.

15. A pultruded fiber reinforced resin article of manufacture having as the fiber reinforcement a plurality of resin impregnated fiber strands placed in spaced relationship to each other and running parallel to each other and at least one axis of the article and having at least two resin impregnated reinforcement mats positioned on opposite sides of said strands.

16. The pultruded fiber reinforced article of claim 15, wherein the fiber strands are glass fiber strands and the reinforcement mats are glass fiber mats.

17. The article of claim 16, wherein the resin is a polyester resin.

18. The article of claim 17, wherein the resin contains a filler.

19. The article of claim 16, wherein the resin is a thermoset resin.

20. The article of claim 19, wherein the resin contains a filler.

21. The pultruded fiber reinforced resin article of claim 15, wherein the fiber strands are glass fibers and the mats are composite needled mats of synthetic fibers and glass fibers.

22. The article of claim 21, wherein the resin is a polyester resin.

23. The article of claim 22, wherein the resin contains a filler.

24. The article of claim 21, wherein the resin is a thermoset resin.

25. The article of claim 24, wherein the resin contains a filler.

26. The article of claim 15 wherein the resin is a thermoplastic resin.

27. A fiber containing reinforcing mat comprising a first mat of strands in the form of a scrim cloth having at least four holes per square inch therein, a second mat of continuous strands coextensive with said first mat, said first mat and said second mat being mechanically bonded together by needling to provide a spiked major surface and non-spiked major surface on the resulting reinforcing mat.

28. The mat of claim 1, wherein said second mat is a mat of continuous glass fiber strands.

29. The mat of claim 28, wherein said first mat is made of synthetic fibers.

30. The mat of claim 28, wherein said first mat is made of natural fibers.

31. The mat of claim 28, wherein said first mat is made of glass fibers.

32. A fiber containing reinforcing mat comprising a first mat of strands in the form of a scrim cloth having at least four holes per square inch therein, a second mat of continuous strands substantially coextensive with said first mat, said first and second mats being bonded together by needling to provide an integral mat.

33. The mat of claim 32 wherein said first and second mats are made of glass fibers.

34. The article of claim 32 wherein the resin is a thermoplastic resin.

* * * * *